US012028644B2

United States Patent
Nguyen

(10) Patent No.: US 12,028,644 B2
(45) Date of Patent: Jul. 2, 2024

(54) MERGING SCALED FOREGROUND AND BACKGROUND TEMPLATES

(71) Applicant: Zoom Video Communications, Inc., San Jose, CA (US)

(72) Inventor: Thanh Le Nguyen, Belle Chasse, LA (US)

(73) Assignee: Zoom Video Communications, Inc., San Jose, CA (US)

( * ) Notice: Subject to any disclaimer, the term of this patent is extended or adjusted under 35 U.S.C. 154(b) by 41 days.

(21) Appl. No.: 17/749,126

(22) Filed: May 19, 2022

(65) Prior Publication Data

US 2023/0379425 A1 Nov. 23, 2023

(51) Int. Cl.
*H04N 5/272* (2006.01)
*H04N 5/262* (2006.01)

(52) U.S. Cl.
CPC ........... *H04N 5/272* (2013.01); *H04N 5/2628* (2013.01)

(58) Field of Classification Search
CPC .............................. H04N 5/272; H04N 5/2628
USPC ............................................. 348/14.02–14.9
See application file for complete search history.

(56) References Cited

U.S. PATENT DOCUMENTS

| 10,757,346 | B1 * | 8/2020 | Adams | G06V 20/49 |
| 2013/0314421 | A1 * | 11/2013 | Kim | G06T 19/00 345/427 |
| 2016/0234522 | A1 * | 8/2016 | Lu | H04N 7/152 |
| 2021/0392292 | A1 * | 12/2021 | Benman | H04N 7/157 |

* cited by examiner

*Primary Examiner* — Maria El-Zoobi

(74) *Attorney, Agent, or Firm* — Young Basile Hanlon & MacFarlane, P.C.

(57) ABSTRACT

Various embodiments of an apparatus, method(s), system(s) and computer program product(s) described herein are directed to a Scaling Engine. The Scaling Engine identifies a background object portrayed in a background template for a video feed. The Scaling Engine determines a background template display position for concurrent display of the background object with video feed data. The Scaling Engine generates a scaled background template by modifying a current aspect ratio of the background template with the background object set at the background display position according to a video feed aspect ratio. The Scaling Engine generates a merged video feed by merging the scaled background template with live video feed data, the merged video feed data providing an unobstructed portrayal of the identified background object.

17 Claims, 22 Drawing Sheets

420

440

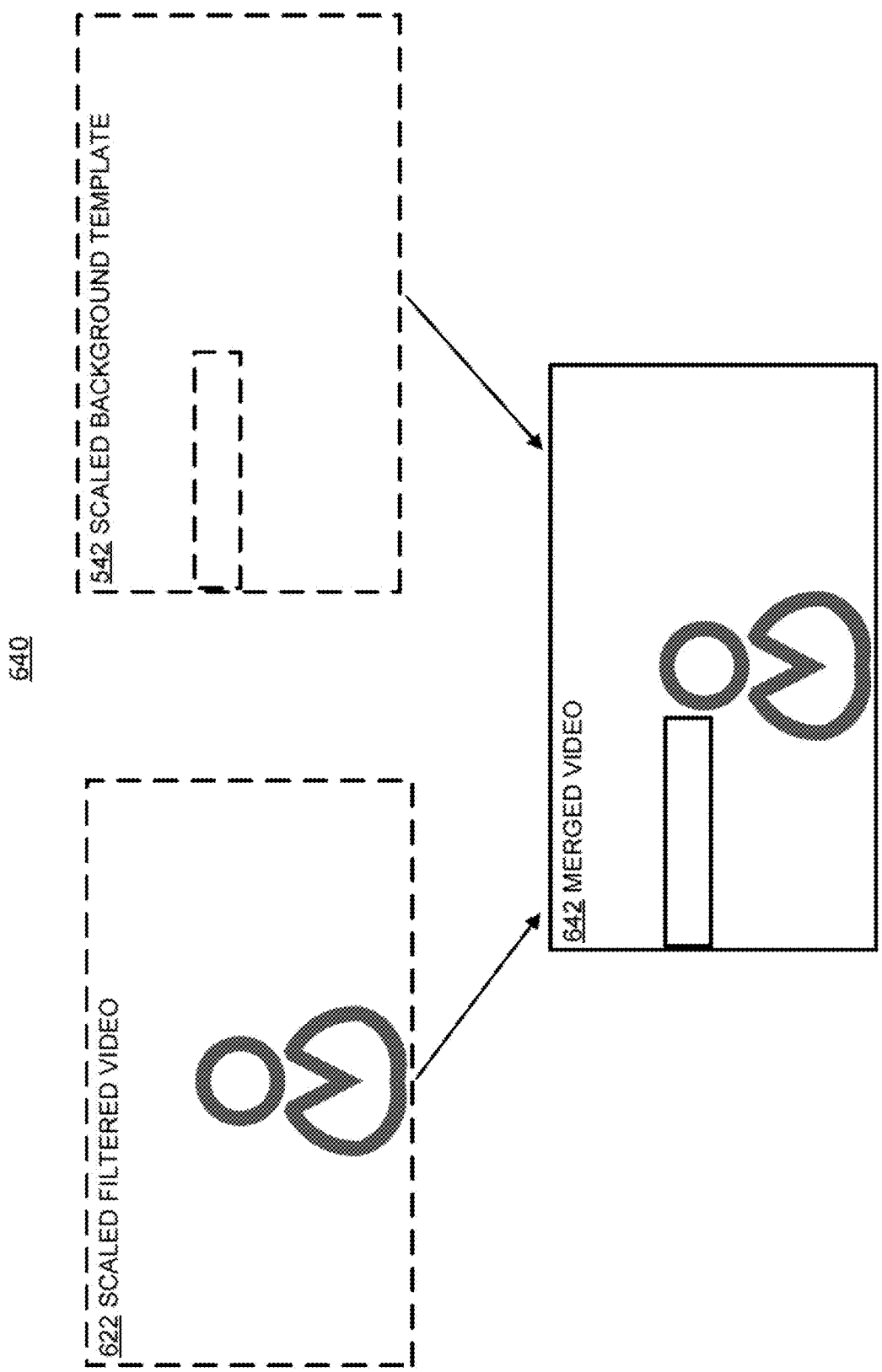

MERGING SCALED FOREGROUND AND BACKGROUND TEMPLATES

FIELD

Various embodiments relate generally to digital communication, and more particularly, to online video and audio.

SUMMARY

The appended Abstract may serve as a summary of this application.

BRIEF DESCRIPTION OF THE DRAWINGS

The present disclosure will become better understood from the detailed description and the drawings, wherein:

FIGS. 6A, 6B, 6C, 6D, 6E, 6F and 6G ("6A-G") are each a diagram illustrating an exemplary environment in which some embodiments may operate.

DETAILED DESCRIPTION OF THE DRAWINGS

Figure 1A:
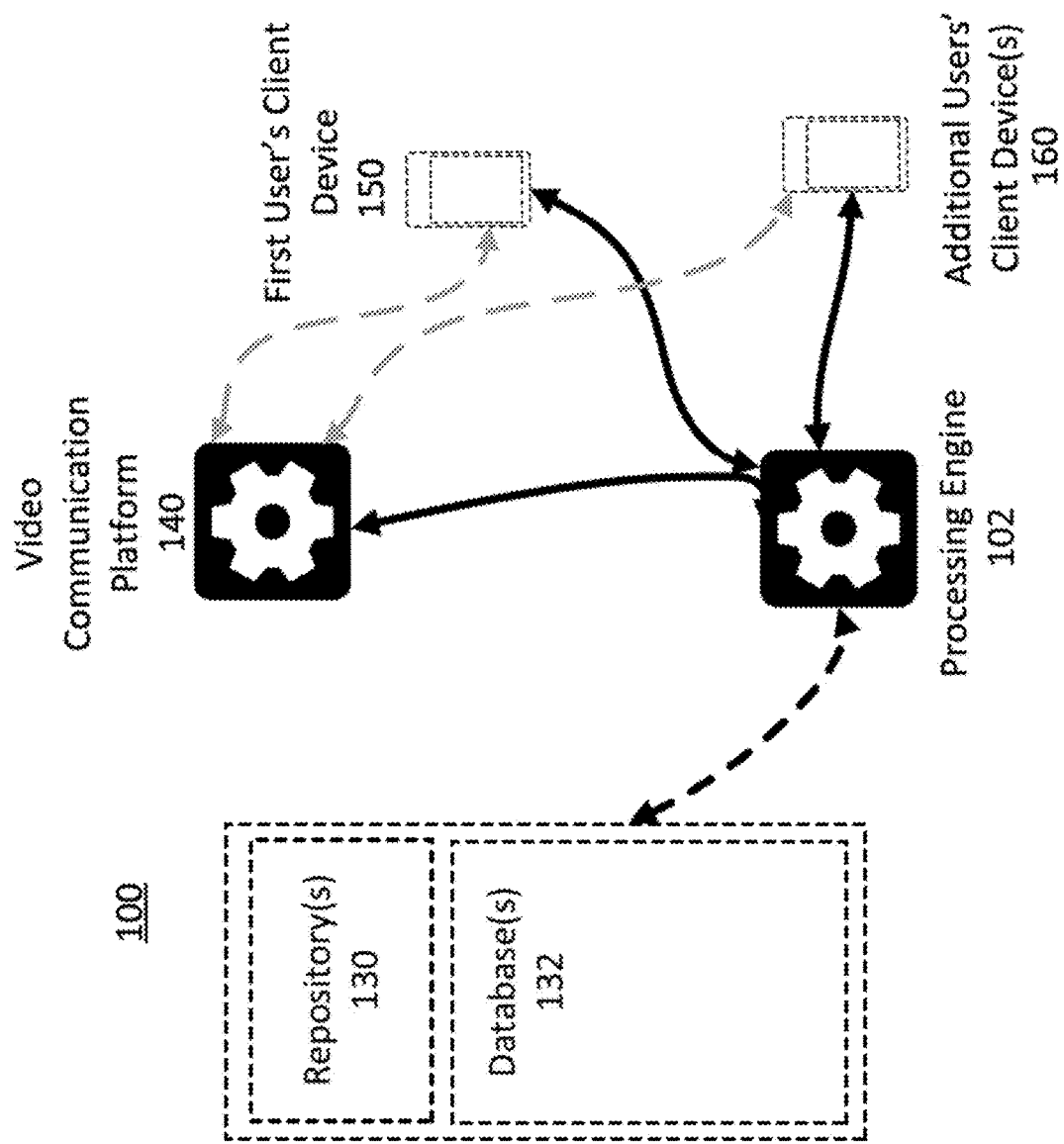
FIG. 1A is a diagram illustrating an exemplary environment in which some embodiments may operate.

Various embodiments of a Scaling Engine are described herein that provide functionality for generating a merged video feed that portrays video feed data from a background template and a foreground template that are both properly scaled according to the same aspect ratio. The background template may portray, for example, a scene of a simulated office, a simulated outdoor space or a simulated corporate space, etc. The foreground template may be a silhouette cut-out of a human form (i.e. upper torso and head) through which the Scaling Engine filters a live video feed to isolate and capture video feed data portraying an individual.

The Scaling Engine identifies pre-defined objects portrayed in the background template and determines a background display position for the background template based on an instance of the identified object. The background display position sets the background template within a frame of the video feed that allows for an unobstructed view of the instance of the identified object. For example, the object may be a corporate logo. The Scaling Engine modifies (i.e. expands, compresses) the background template according to a current video aspect ratio and positions the background template according to the background display position in order to ensure the view of the object (e.g. the logo) remains unobstructed.

The Scaling Engine filters a live video feed associated with a user account through the silhouette cut-out of the foreground template. The filtered live video feed thereby portrays, for example, a portion(s) of a body and head of an individual currently physically situated in front of a webcam. The Scaling Engine further modifies the filtered live video feed data according to the current video aspect ratio as well. The Scaling Engine overlays the filtered live video feed upon a scaled version of the positioned background template. The Scaling Engine merges the overlayed live video feed and the scaled background template to generate a merged video feed as output.

The merged video feed portrays the individual (i.e. the individual in front of the webcam) as being present within the simulated scene of the background template. However, because both the background template and the filtered live video feed are scaled at the same aspect ratio, the merged video feed creates a sense of depth for any user account viewing the merged video feed. The sense of depth is created as a consequence of both the background template and the filtered live video feed each being set (e.g. expanded, compressed) to the same aspect ratio. The merged video feed thereby provides a more pleasing and comfortable user experience to a user account(s) viewing the merged video feed because the proportional portrayal of the individual relative to scene of the background template is more realistic and ultimately less distracting.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the invention. The invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

FIG. 1A is a diagram illustrating an exemplary environment in which some embodiments may operate. In the exemplary environment 100, a sending client device 150, one or more receiving client device(s) 160 are connected to a processing engine 102 and, optionally, a communication platform 140. The processing engine 102 is connected to the communication platform 140, and optionally connected to one or more repositories 130 and/or databases 132 of historical virtual online event data, such as historical virtual meeting data One or more of the databases may be combined or split into multiple databases. The sending client device 150 and receiving client device(s) 160 in this environment may be computers, and the communication platform server 140 and processing engine 102 may be applications or software hosted on a computer or multiple computers which are communicatively coupled via remote server or locally.

The exemplary environment 100 is illustrated with only one sending client device, one receiving client device, one processing engine, and one communication platform, though in practice there may be more or fewer sending client devices, receiving client devices, processing engines, and/or communication platforms. In some embodiments, the sending client device, receiving client device, processing engine, and/or communication platform may be part of the same computer or device.

In an embodiment(s), the processing engine 102 may perform method 300 or other methods herein. In some embodiments, this may be accomplished via communication with the sending client device, receiving client device(s), processing engine 102, communication platform 140, and/or other device(s) over a network between the device(s) and an application server or some other network server. In some embodiments, the processing engine 102 is an application, browser extension, or other piece of software hosted on a computer or similar device or is itself a computer or similar device configured to host an application, browser extension, or other piece of software to perform some of the methods and embodiments herein.

Sending client device 150 and receiving client device(s) 160 are devices with a display configured to present information to a user of the device. In some embodiments, the sending client device 150 and receiving client device(s) 160 present information in the form of a user interface (UI) with UI elements or components. In some embodiments, the sending client device 150 and receiving client device(s) 160 send and receive signals and/or information to the processing engine 102 and/or communication platform 140. The sending client device 150 is configured to submit messages (i.e., chat messages, content, files, documents, media, or other forms of information or data) to one or more receiving client device(s) 160. The receiving client device(s) 160 are configured to provide access to such messages to permitted users within an expiration time window. In some embodiments, sending client device 150 and receiving client device(s) are computer devices capable of hosting and executing one or more applications or other programs capable of sending and/or receiving information. In some embodiments, the sending client device 150 and/or receiving client device(s) 160 may be a computer desktop or laptop, mobile phone, virtual assistant, virtual reality or augmented reality device, wearable, or any other suitable device capable of sending and receiving information. In some embodiments, the processing engine 102 and/or communication platform 140 may be hosted in whole or in part as an application or web service executed on the sending client device 150 and/or receiving client device(s) 160. In some embodiments, one or more of the communication platform 140, processing engine 102, and sending client device 150 or receiving client device 160 may be the same device. In some embodiments, the sending client device 150 is associated with a sending user account, and the receiving client device(s) 160 are associated with receiving user account(s).

In some embodiments, optional repositories function to store and/or maintain, respectively, user account information associated with the communication platform 140, conversations between two or more user accounts of the communication platform 140, and sensitive messages (which may include sensitive documents, media, or files) which are contained via the processing engine 102. The optional repositories may also store and/or maintain any other suitable information for the processing engine 102 or communication platform 140 to perform elements of the methods and systems herein. In some embodiments, the optional database(s) can be queried by one or more components of system 100 (e.g., by the processing engine 102), and specific stored data in the database(s) can be retrieved.

Communication platform 140 is a platform configured to facilitate communication between two or more parties, such as within a conversation, "chat" (i.e., a chat room or series of public or private chat messages), video conference or meeting, message board or forum, virtual meeting, or other form of digital communication. In some embodiments, the platform 140 may further be associated with a video communication environment and a video communication environment client application executed on one or more computer systems.

Figure 1B:
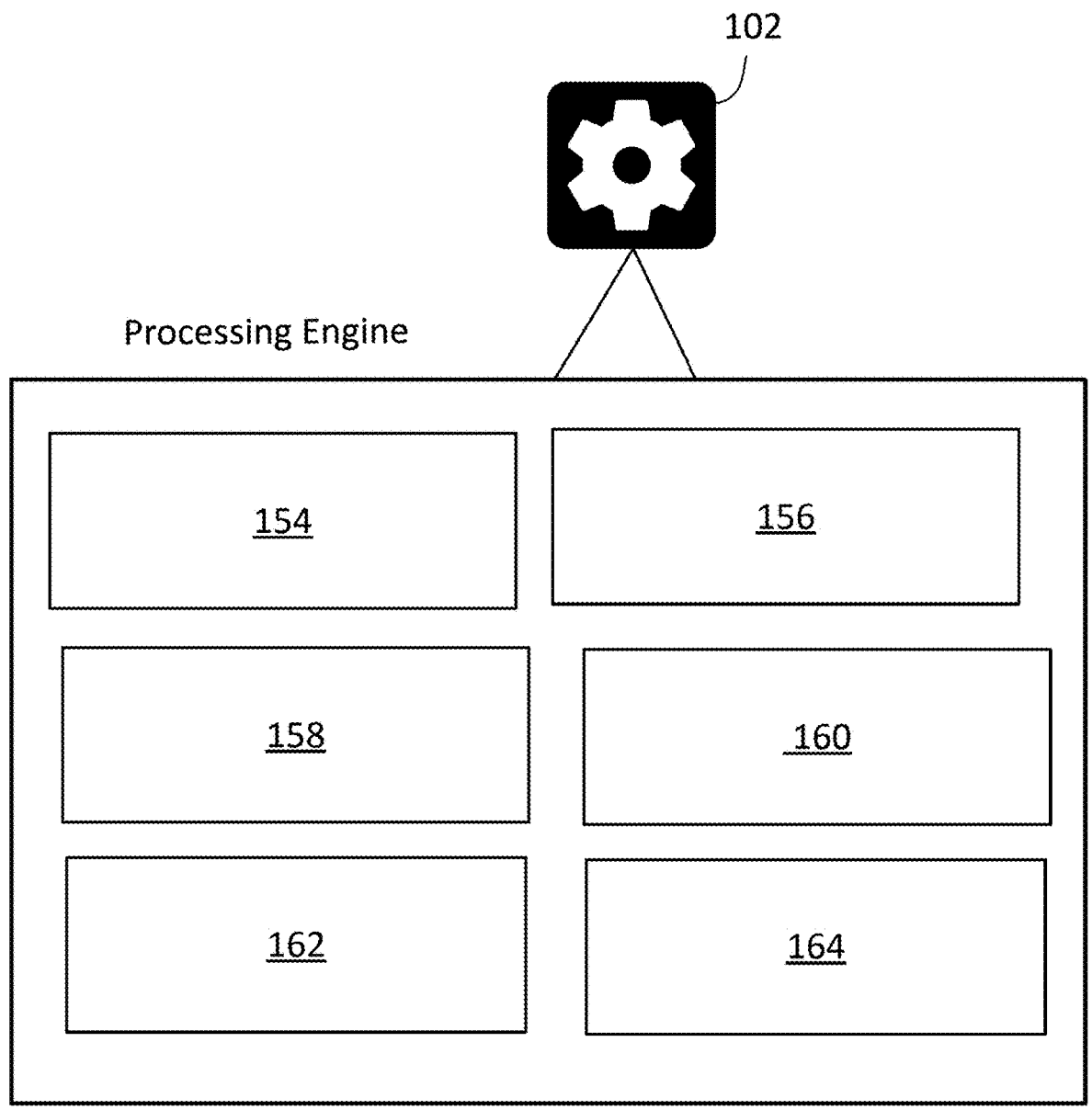
FIG. 1B is a diagram illustrating an exemplary environment in which some embodiments may operate.

FIG. 1B is a diagram illustrating exemplary software modules 154, 156, 158, 160, 162, 164 of a Scaling Engine that may execute at least some of the functionality described herein. According to some embodiments, one or more of exemplary software modules 154, 156, 158, 160, 162, 164 may be part of the processing engine 102. In some embodiments, one or more of the exemplary software modules 154, 156, 158, 160, 162, 164 may be distributed throughout the communication platform 140.

The module 154 functions to identify a background object portrayed in a background template.

The module 156 functions to determine a background and/or a foreground template display position.

The module 158 functions to generated scaled data, such as, a scaled background template and/or scaled video feed data.

The module 160 functions to filter live video feed data according to a foreground template.

The module 162 functions to generate merged video feed data.

The module 164 functions to determine whether updated scaled video feed data should be generated.

The above modules 154, 156, 158, 160, 162, 164 and their functions will be described in further detail in relation to FIGS. 3, 4A-F, 5A-D and 6A-G.

Figure 2:
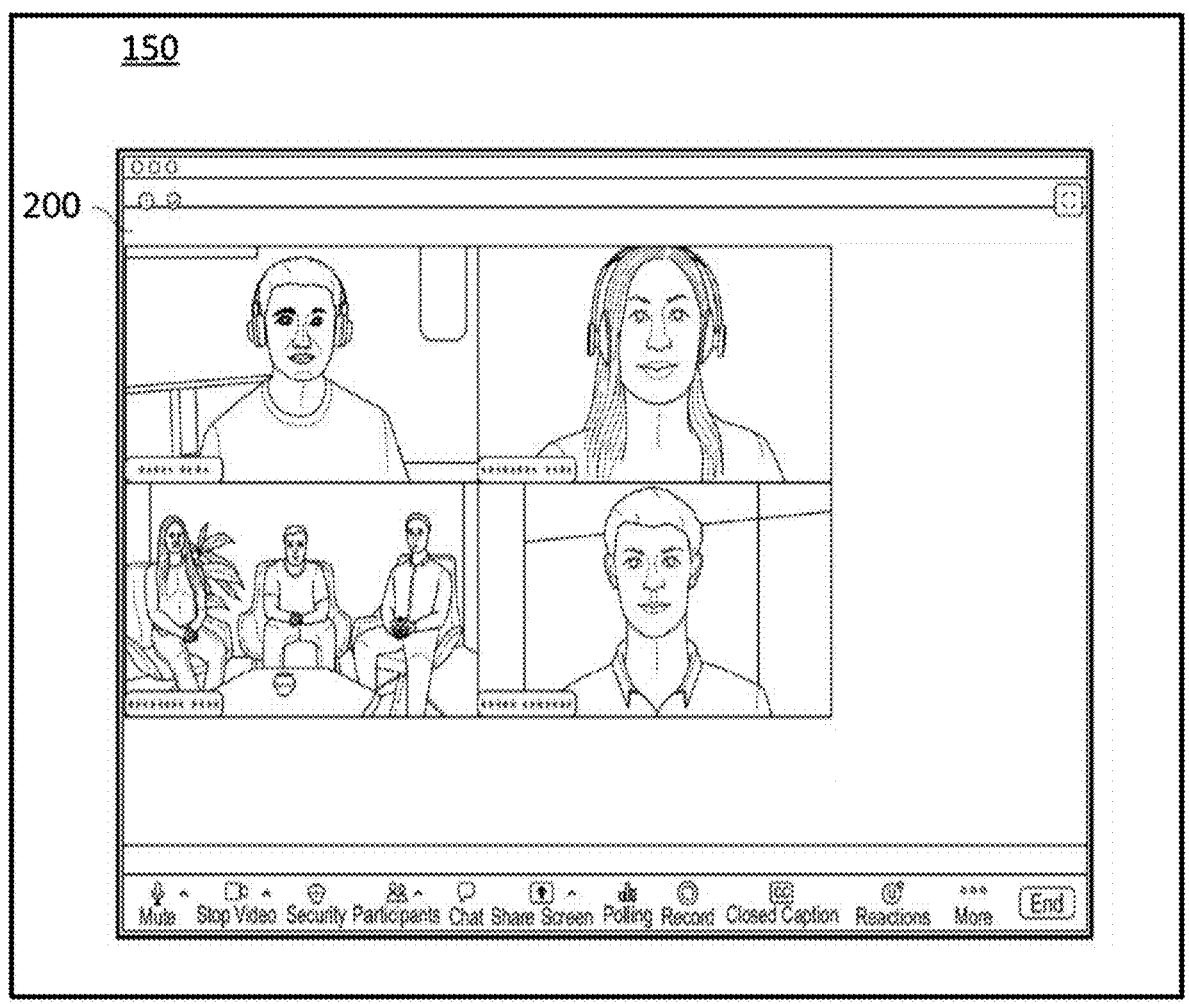
FIG. 2 is a diagram illustrating an exemplary environment in which some embodiments may operate.

As shown in the example of FIG. 2, a user account communications interface 200 for accessing and communicating with the platform 140 and displayed at a computer device 150. The interface 200 provides access to video data, audio data, chat data and meeting transcription related to an online event(s), such as a virtual webinar or a virtual meeting joined by a user account associated with the computer device 150. The interface 200 further provides various types of tools, functionalities, and settings that can be selected by a user account during an online event. Various types of virtual meeting control tools, functionalities, and settings are, for example, mute/unmute audio, turn on/off video, start meeting, join meeting, view and call contacts.

Figure 3:
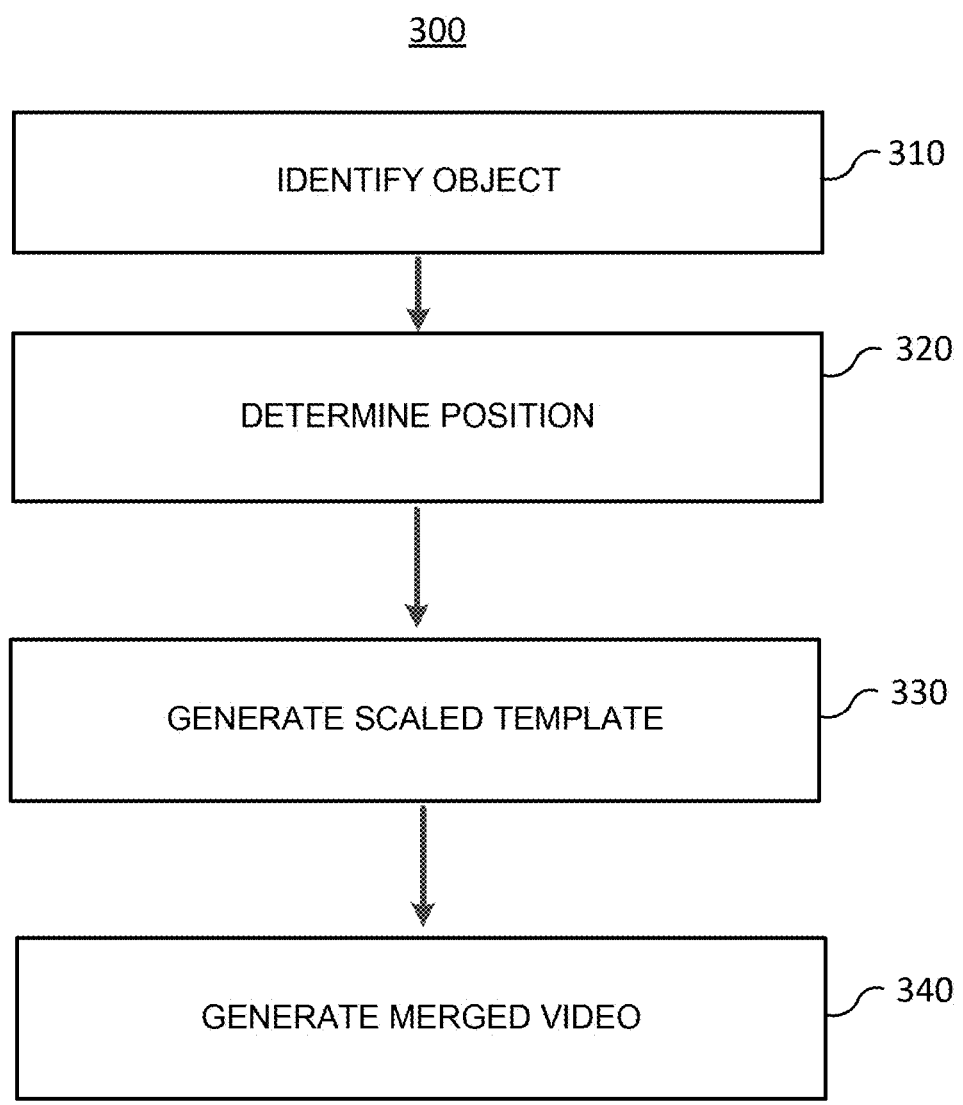
FIG. 3 is a diagram illustrating an exemplary flowchart according to some embodiments.

As shown in flowchart diagram 300 of the example of FIG. 3, the Scaling Engine identifies a background object portrayed in a background template for a video feed. (Act 310) In some embodiments, the Scaling Engine receives the background template as a template selected (or uploaded) by a user account. The Scaling Engine determines a background template display position for concurrent display of the background object with video feed data. (Act 320) The Scaling Engine generates a scaled background template by modifying a current aspect ratio of the background template with the background object set at the background display position according to a video feed aspect ratio. (Act 330)

The Scaling Engine generates a merged video feed by merging the scaled background template with live video feed data, the merged video feed data providing an unobstructed portrayal of the identified background object. (Act 340)

Additional acts of the method 300 further include the Scaling Engine receiving a selection of a foreground display position of a foreground template for the video feed. In various embodiments, a user account selects which type of foreground template will be deployed by the Scaling Engine. The foreground display position is thereby implicitly selected but user account by way of the user account's selection of a preferred foreground template. The Scaling Engine then filters the live video feed data according to the foreground template. The Scaling Engine generates scaled video feed data by modifying a current aspect ratio of the filtered live video data according to the video feed aspect ratio. The Scaling Engines generates the merged video feed (Act 340) by merging the scaled background template with the scaled video feed data.

In some embodiments, the modules 154, 156, 158, 160, 162, 164 and their functions (described in relation to FIGS. 3, 4A-F, 5A-D and 6A-G) may reside and/or occur at a client software application that corresponds to the communication platform 140. For example, the client software application may be installed locally on a computer device associated with a specific user account. The client software application thereby performs method 300 and transmits the merged video feed to the communication platform 140 which then, in turn, transmits the merged video feed to be displayed to other user accounts.

Figure 4A:
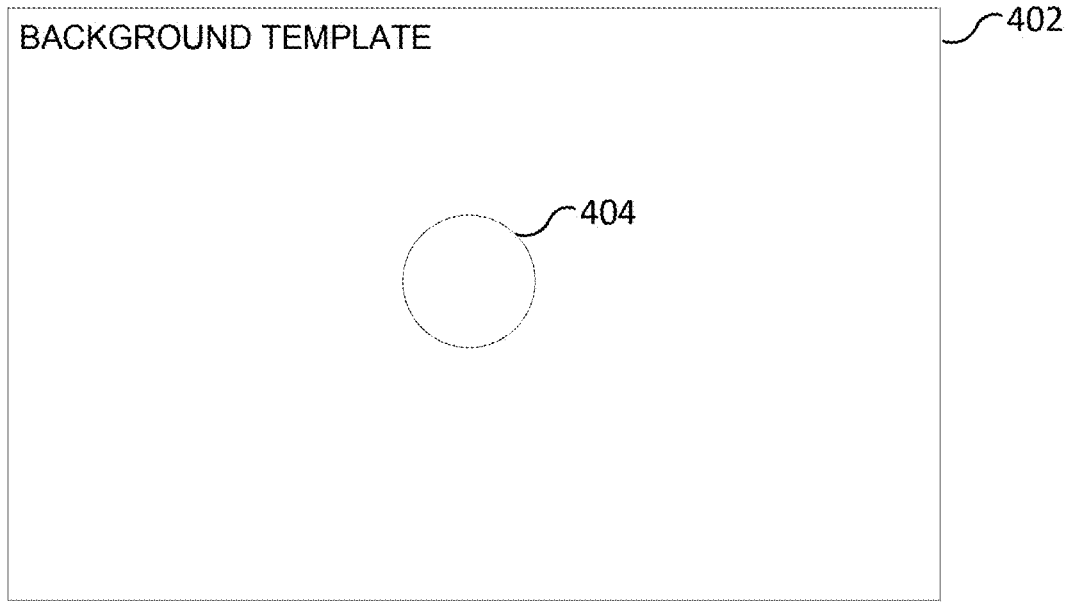
FIGS. 4A, 4B, 4C, 4D, 4E and 4F ("4A-F") are each a diagram illustrating an exemplary environment in which some embodiments may operate.

As shown in diagram 400 of the example of FIG. 4A, the Scaling Engine identifies a background object 404 portrayed in a background template 402 for a video feed. In various embodiments, the background object 404 may be a corporate logo, a region in the background template that includes display of a contiguous line and/or a type of pre-defined object. There may be a plurality of pre-defined objects such as, for example, a window object, a chair object, a desk object, a plant object, etc.

Figure 4B:
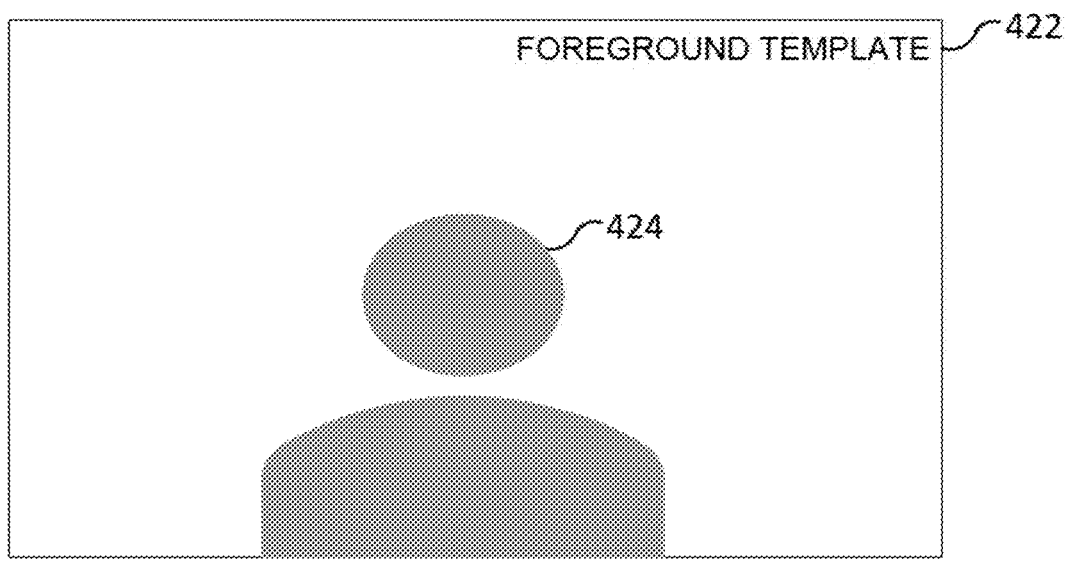

As shown in diagram 420 of the example of FIG. 4B, a foreground template 422 may be defined according to boundaries of a silhouette 424 cut-out at the center of a video frame. Live video feed data may be filtered by the Scaling Engine through the foreground template 422 in order to isolate portrayal of an individual sitting in front of a webcam. The Scaling Engine captures the isolated video feed data and positions the isolated video feed data within the boundaries of the silhouette 424. The Scaling Engine generated filtered live video feed data that portrays the individual at the center of video frames and within the boundaries of the silhouette 424. In some embodiments, the Scaling Engine receives a user selection indicating a user account prefers to use the foreground template 422

Figure 4C:
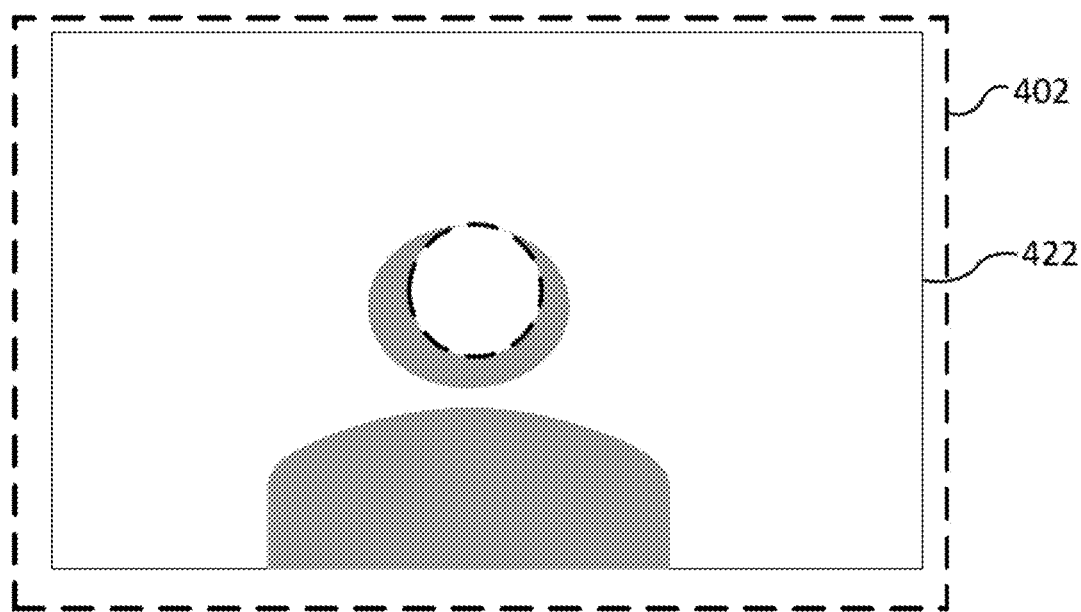

As shown in diagram 430 of the example of FIG. 4C, due to the position of the detected object 404 and the position of the silhouette 424, any merged video feed based on the background and foreground templates 402, 422 will result in an obstructed view of either the object 404 or the portrayal of the individual provided by the filtered live video feed data.

Figure 4D:
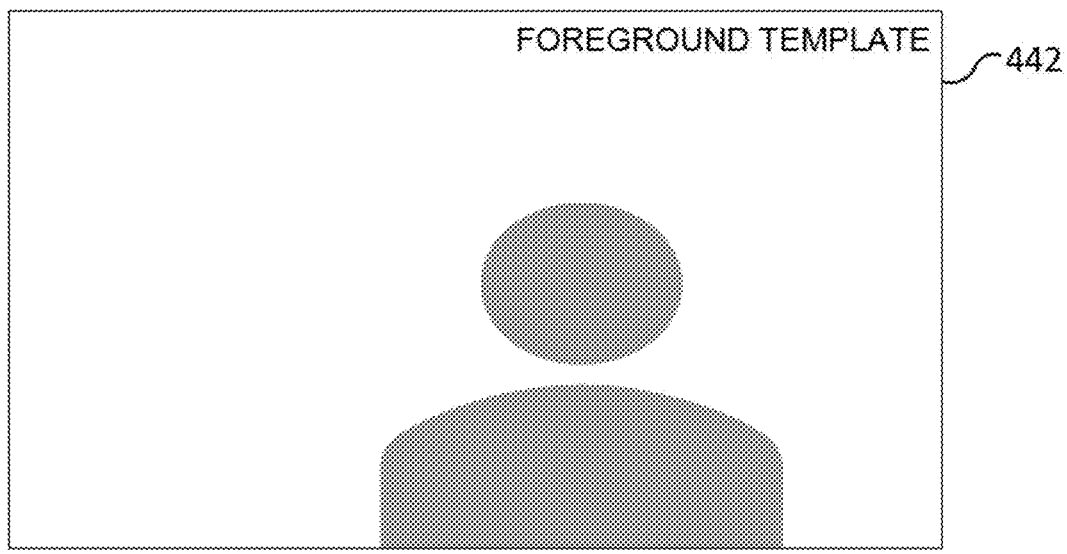
Figure 4E:
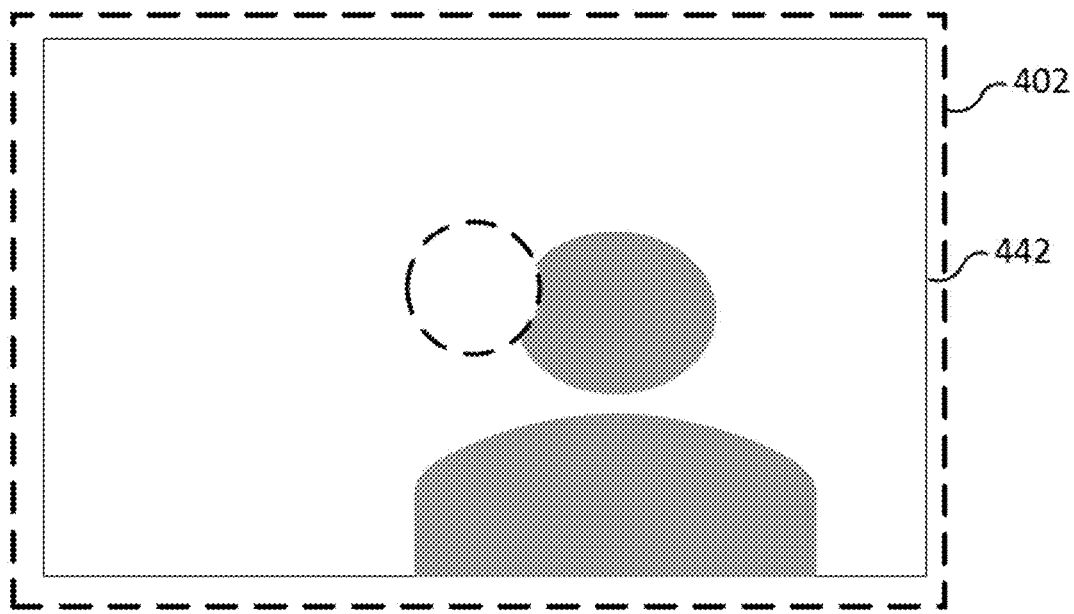

As shown in diagram 440 of the example of FIG. 4D, another type of foreground template 442 may be defined according to boundaries of a silhouette that is position off of the center of the video frame. In some embodiments, the Scaling Engine receives a user selection indicating a user account prefers to use the other type of foreground template 442.

As shown in diagram 450 of the example of FIG. 4E, again, any merged video feed based on the background and foreground templates 402, 442 may still result in an obstructed view of either the object 404 or the portrayal of the individual provided by the filtered live video feed data.

Figure 4F:
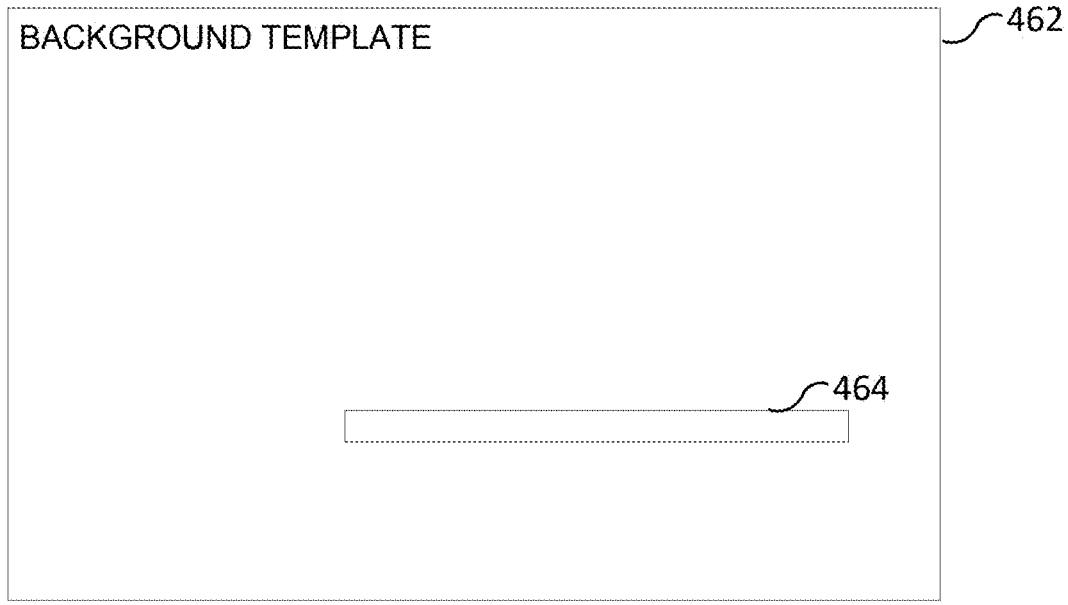

As shown in diagram 460 of the example of FIG. 4F, another type of background template 462 may portray a scene with an object 464 that defines contiguous line region.

Figure 5A:
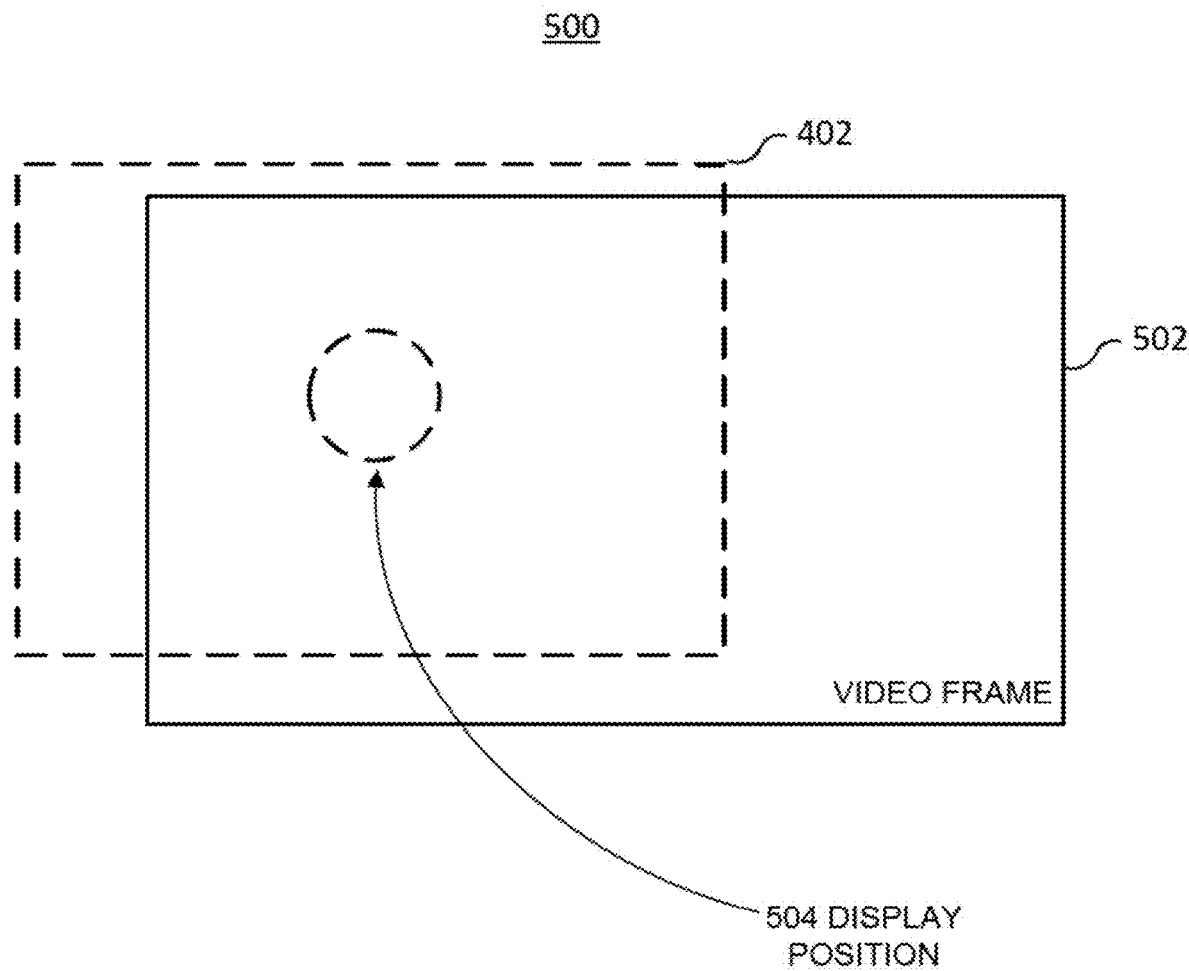
FIGS. 5A, 5B, 5C and 5D ("5A-D") are each a diagram illustrating an exemplary environment in which some embodiments may operate.

As shown in diagram 500 of the example of FIG. 5A, the Scaling Engine determines a background template display position 504 for concurrent display of the background object 404 with video feed data. To avoid an obstructed view of the object 404, the Scaling Engine determines a background template display position 504 for the template 402 with respect to the dimensions of a video frame 502.

Figure 5B:
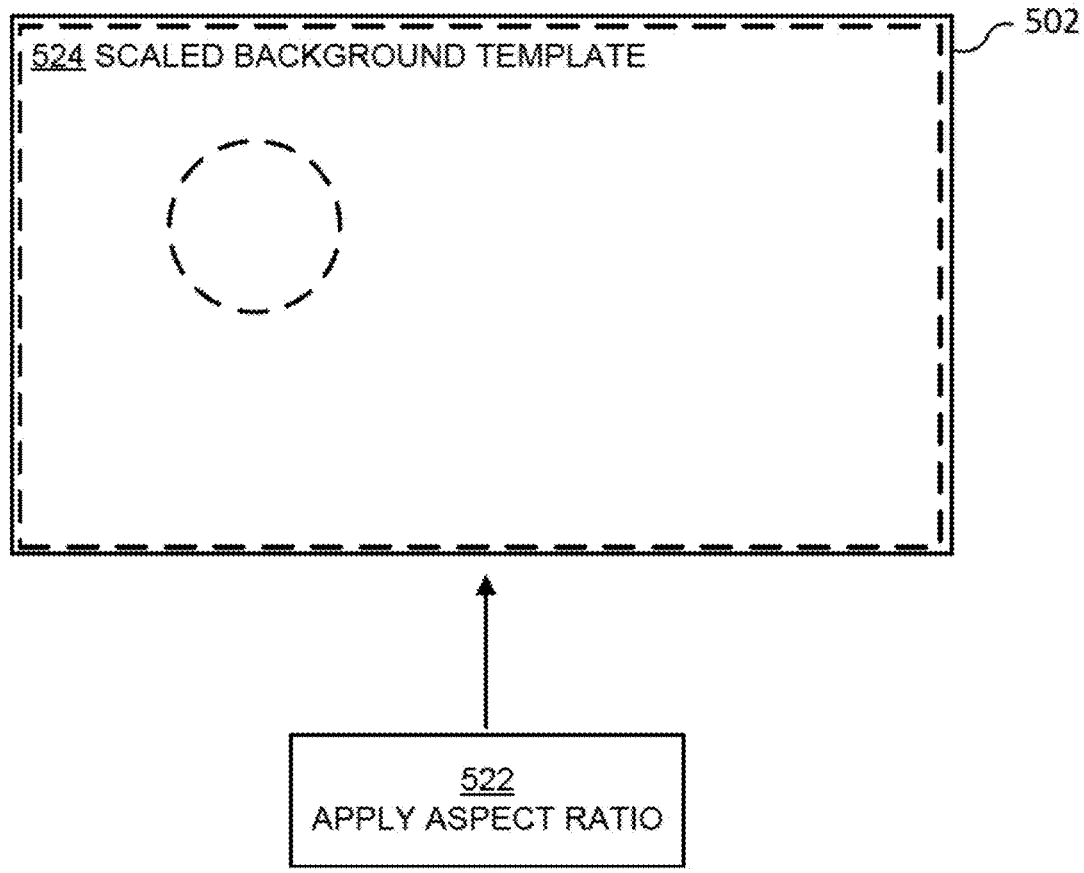

As shown in diagram 520 of the example of FIG. 5B, the Scaling Engine generates a scaled background template 524 by modifying a current aspect ratio of the background template with the background object set at the background display position 504 according to a video feed aspect ratio. For example, the Scaling Engine identifies content from the template 402 that falls within the video frame dimensions 502. The Scaling Engine applies a video aspect ratio 522 to the identified template content to generate the scaled background template 524.

Figure 5C:
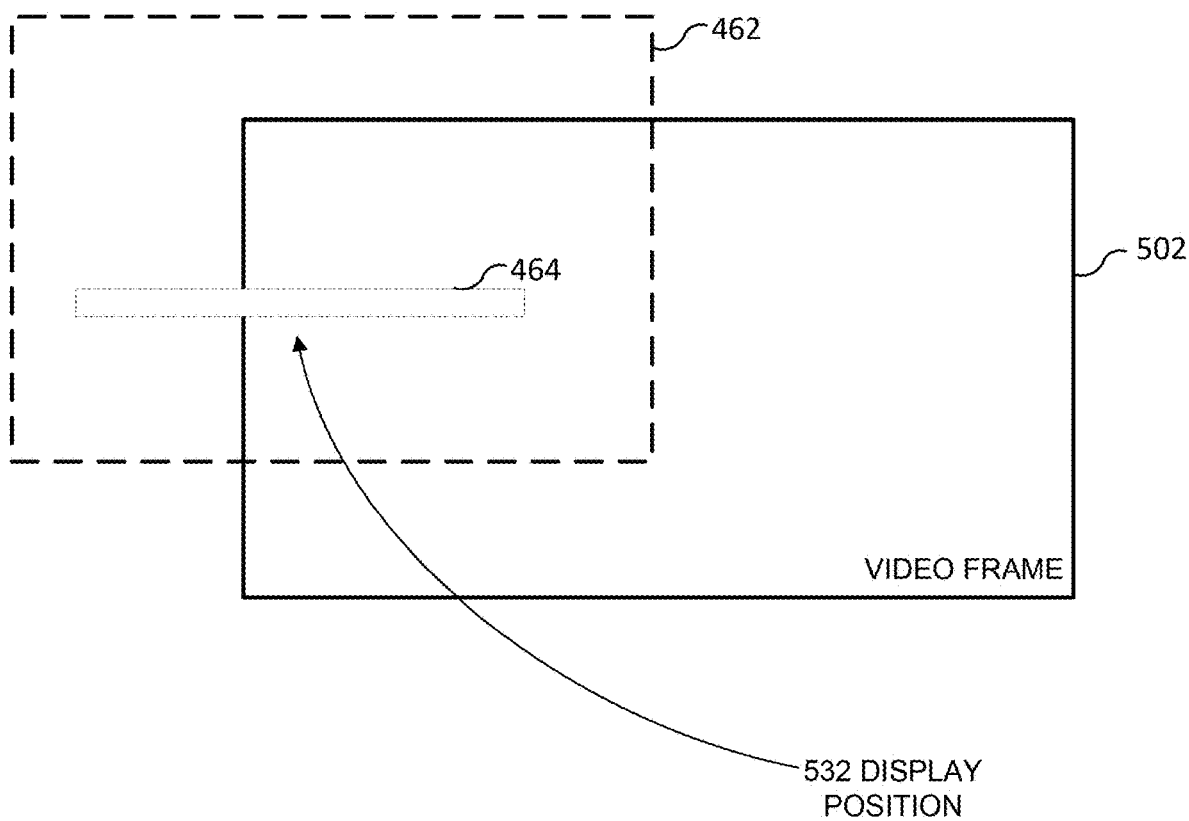

As shown in diagram 530 of the example of FIG. 5C, similarly, the Scaling Engine determines a background template display position 532 for concurrent display of the background object 464 with video feed data. To avoid an obstructed view of the contiguous line region and to employ the contiguous line region as a visual leading line within the scene of the background template 462, the Scaling Engine determines a background template display position 532 for the template 462 with respect to the dimensions of a video frame 502.

Figure 5D:
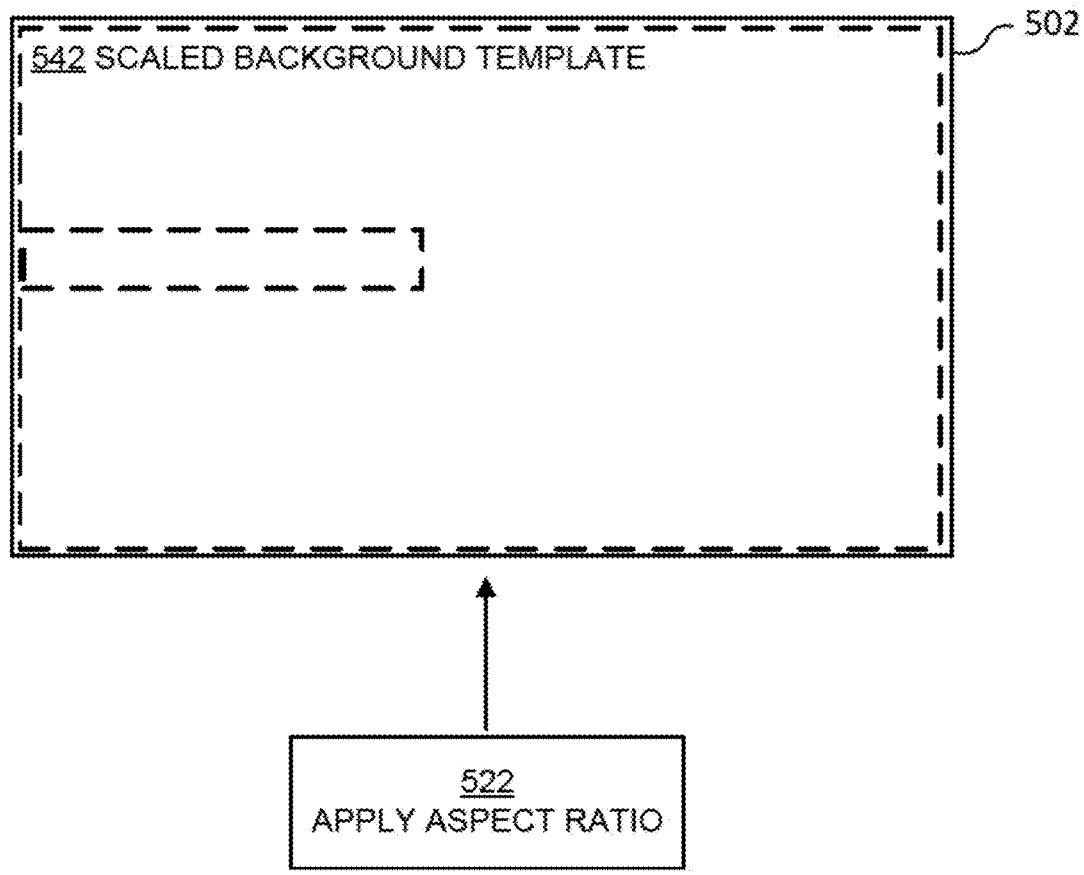

As shown in diagram 540 of the example of FIG. 5D, the Scaling Engine generates a scaled background template 542 by modifying a current aspect ratio of the background template with the background object set at the background display position 532 according to a video feed aspect ratio. For example, the Scaling Engine identifies content from the template 464 that falls within the video frame dimensions 502. The Scaling Engine applies a video aspect ratio 522 to the identified template content to generate the scaled background template 542

Figure 6A:
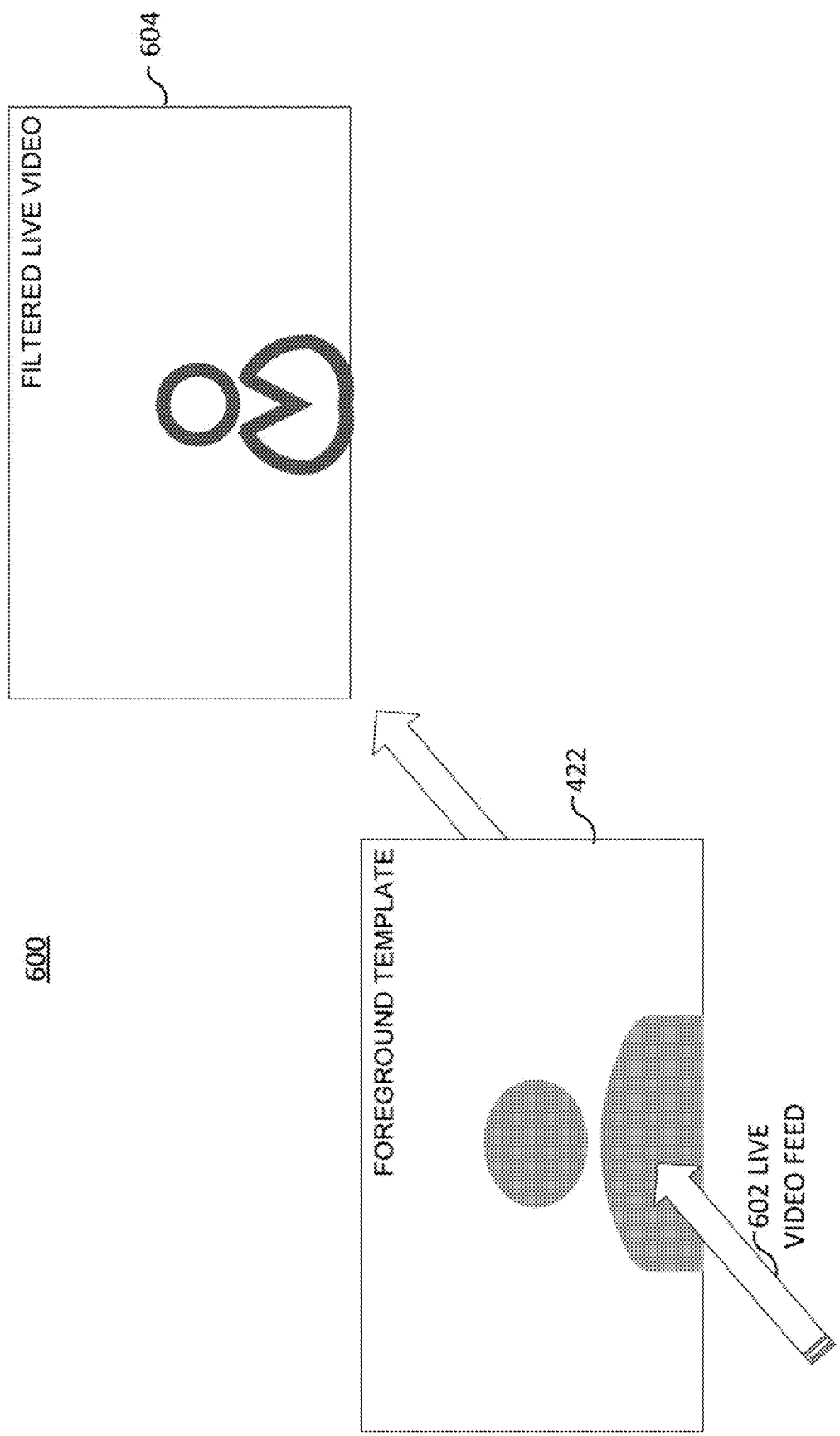

As shown in diagram 600 of the example of FIG. 6A, the Scaling Engine received live video feed data 602. For example, the live video feed data 602 may be generated by a webcam. The Scaling Engine filters the live video feed data 602 according to a foreground template 422 and generates filtered live video data 604. The filtered live video feed data 604 portrays the individual at the center of video frames and within the boundaries of the silhouette of the foreground template 422.

Figure 6B:
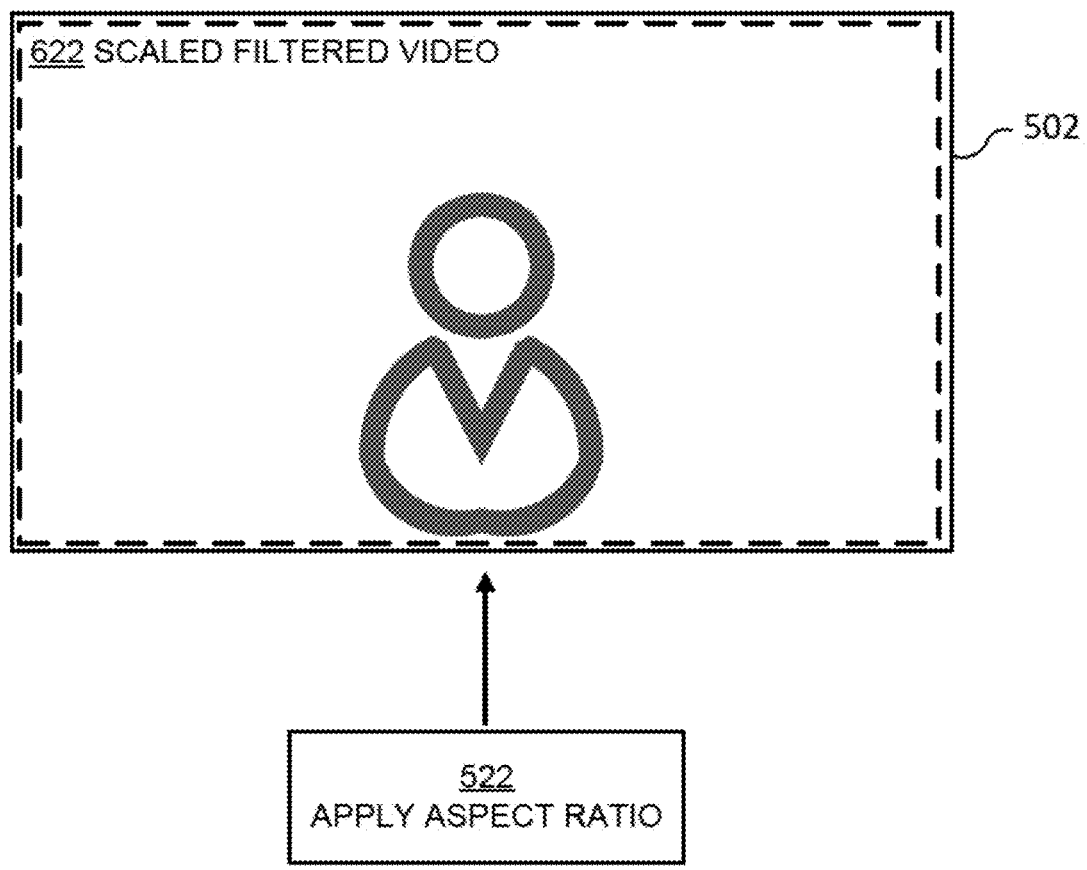

As shown in diagram 620 of the example of FIG. 6B, the Scaling Engine generates scaled filtered video data 622 by applying the video aspect ratio 522 to the filtered live video feed data 604.

Figure 6C:
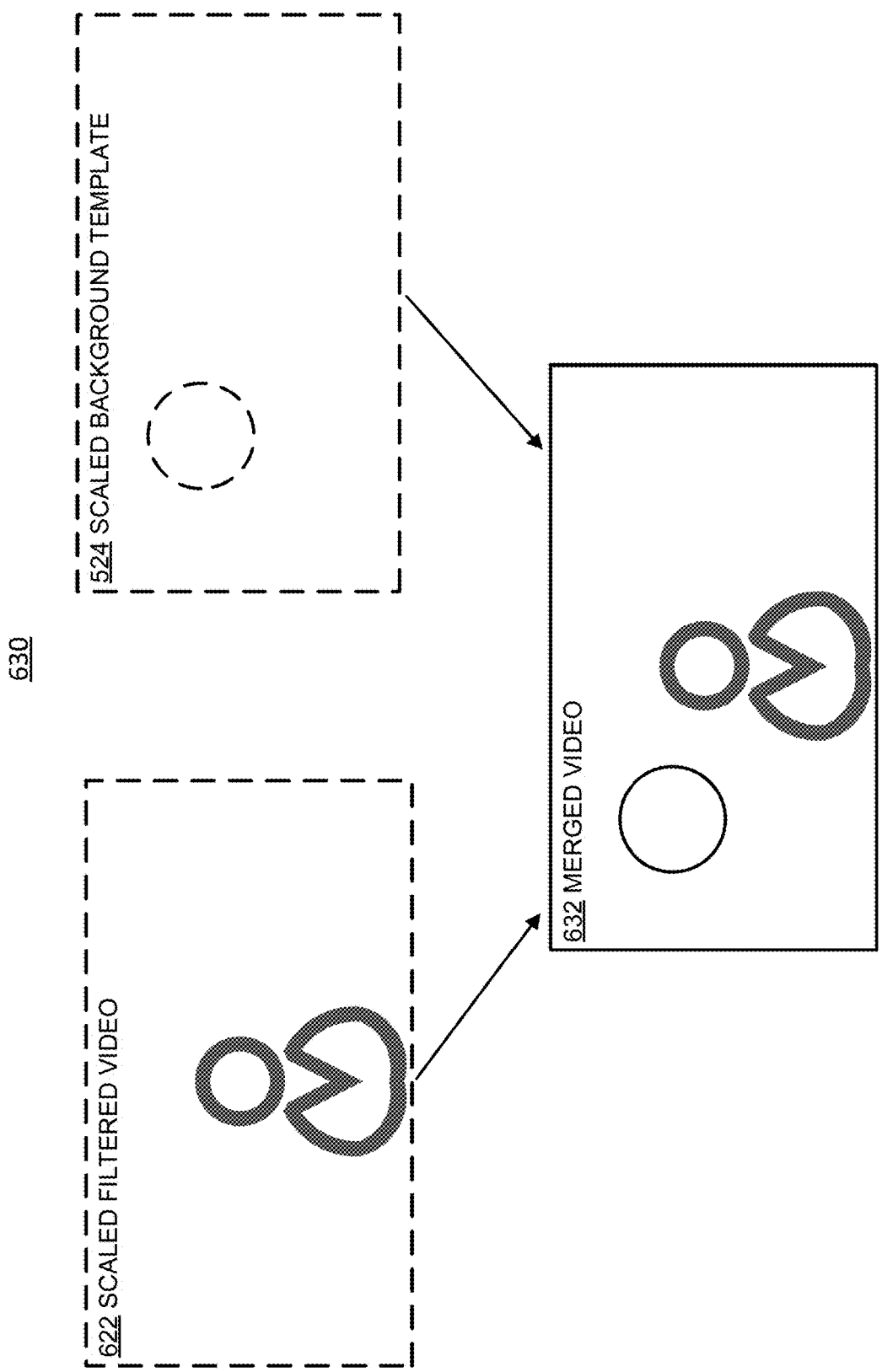

As shown in diagram 630 of the example of FIG. 6C, the Scaling Engine generates merged video feed data 632 by merging the scaled background template 524 with scaled live video feed data 622. For example, the Scaling Engine overlays the scaled live video feed data 622 as a first layer above the scaled background template 524 as a second layer.

The Scaling Engine merges the first and second layers and generates video feed data 632 that is based on both of the layers. As such, the merged video feed data 632 provides an unobstructed portrayal of the identified background object 404.

As shown in diagram 640 of the example of FIG. 6D, similarly, the Scaling Engine generates merged video feed data 642 by merging the scaled background template 542 with the scaled live video feed data 622. For example, the Scaling Engine overlays the scaled live video feed data 622 as a first layer above the scaled background template 542 as a second layer. The Scaling Engine merges the first and second layers and generates video feed data 642 that is based on both of the layers. As such, the merged video feed data 632 provides an unobstructed portrayal of the identified background object 404 acting as a visual leading line that directs a viewer's attention to the portrayal of the individual in the center of the video frame.

Figure 6E:
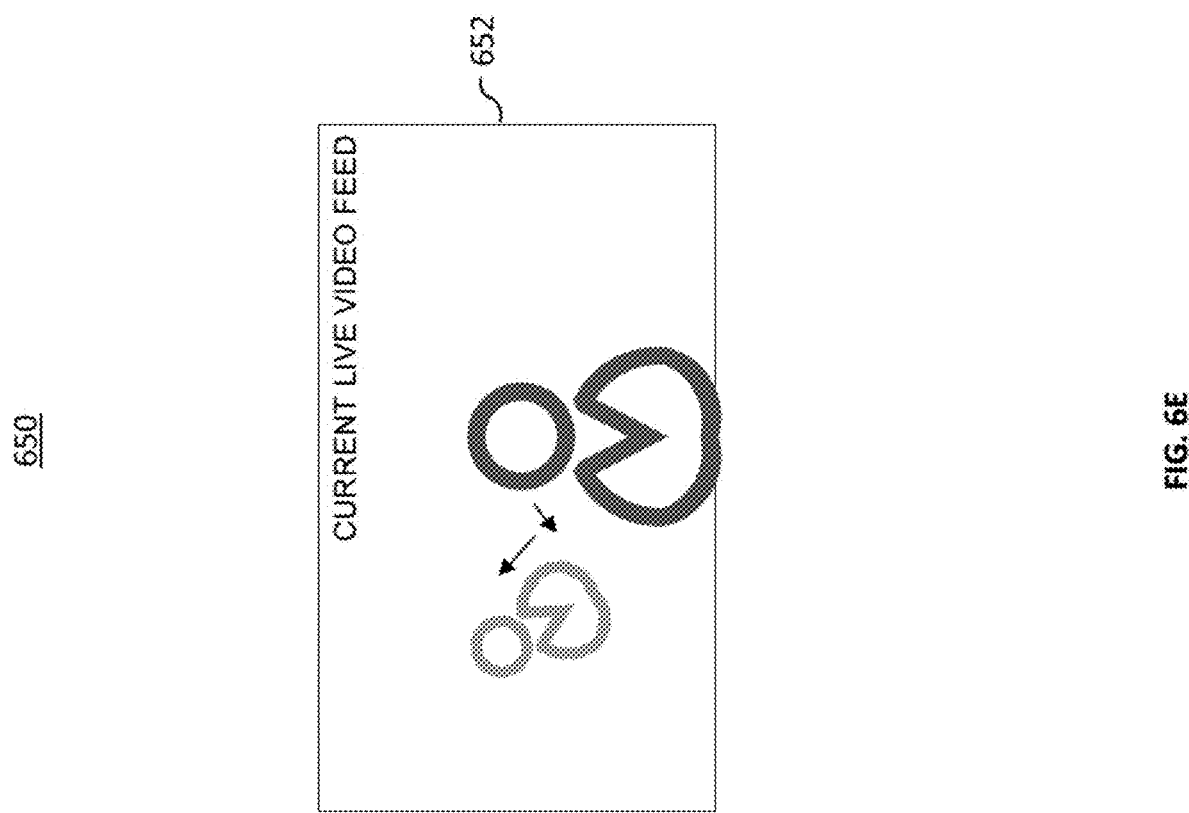

As shown in diagram 650 of the example of FIG. 6E, the Scaling Engine continually receives live video feed data 652 while it transmits the merged video feed 632 (or 642) as output. The individual (i.e. the individual in front of the webcam) may inevitably physically shift and/or move. As such, the individual's portrayal in the live video is not static whereas the silhouette cut-out of the foreground template 442 (or 462) itself is static. For example, the individual may step backwards away from the webcam and off center (i.e. to the side) thereby appearing smaller in the live video feed 652 and distant from the webcam. The placement of the individual in the current live video 652 will further be misaligned with the silhouette of foreground template 442 (or 462). In the alternative, the individual may step towards the webcam thereby appearing larger in the live video feed and closer to the webcam.

In various embodiments, the Scaling Engine continually compares the current live video feed 652 to the silhouette cut-out of the foreground template 442 (or 462) to determine whether the current live video feed 652 needs to be re-scaled due to physical movement and shifting of the individual (i.e. the individual in front of the webcam). As such, if the Scaling Engine determines that visual portrayal of the individual in the current live video feed 652 exceeds a misalignment threshold, the Scaling Engine determines that the current live video feed 652 is to be re-scaled after it has been filtered in order to generate new merged video data based upon the re-scale filtered live video feed data. The misalignment threshold may define a distance that a portion visual portrayal of the individual in the current live video feed 652 may not exceed with respect to one or more boundaries of a foreground template silhouette. If such distance is exceeded, the Scaling Engine thereby triggers re-scaling of filtered live video feed data. It is understood that such re-scaling of filtered live video feed data may occur any number of times in order to maintain a consistent portrayal of the individual at the same aspect ratio regardless of the extent of individual's physical movements and shifting in front of the webcam.

Figure 6F:
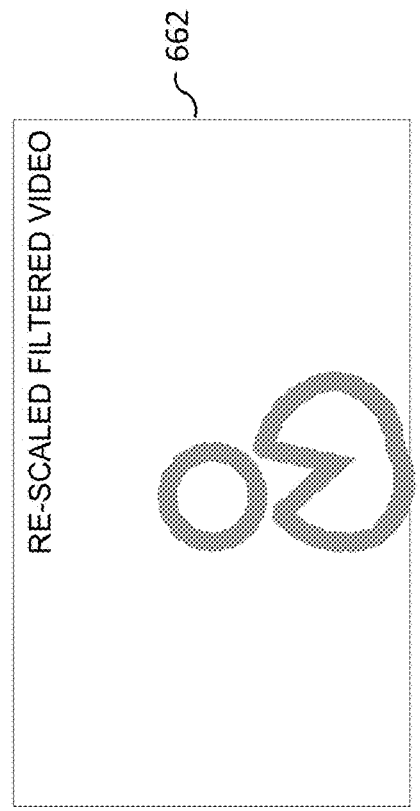
Figure 6G:
Figure 6G:
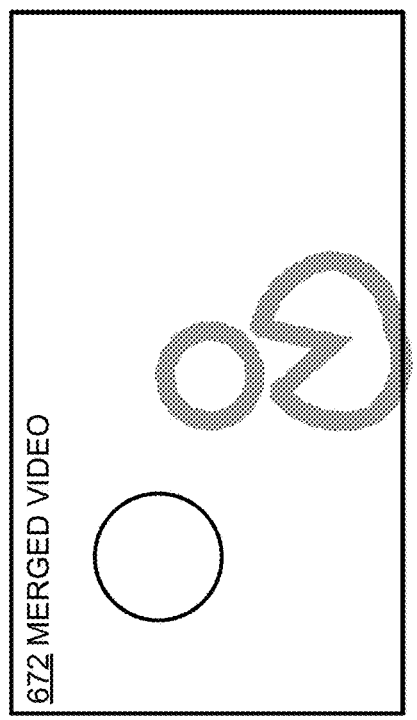

The example of diagram 660 of FIG. 6F illustrates re-scaled filtered video 662 generated by the Scaling Engine resulting from physical movement of the individual (as illustrated in FIG. 6E).

The examples of diagram 670 of FIG. 6F illustrate merged video 672 based on re-scaled filtered video 662 overlayed upon a background template 402 and merged video 674 based on re-scaled filtered video 662 overlayed upon another type of background template 462.

According to various embodiments, a machine learning model of the Scaling Engine may be trained on training data based on various types of different background templates that portray various types of scenes. The training data may further provide data defining certain types of objects in the various types of different background templates. The training data may further include data that corresponds to various scaled (i.e. compressed, expanded) versions of the different background templates according to a multitude of aspect ratios. The training data may further include various optimal display positions the various types of objects.

In one or more embodiments, the Scaling Engine receives a user selection of a type of foreground template and a user selected background template. The Scaling Engine may feed the user selected foreground and background templates into the machine learning network. The machine learning network returns output of predictions of the types of objects portrayed in the scene of the user selected background template. The machine learning network for the Scaling Engine may further return predicted background template display positions for each predicted object with respect to one or more video aspect ratios. It is understood that various types of machine learning networks, techniques and/or algorithms may be implemented by the machine learning model for the Scaling Engine.

Figure 7:
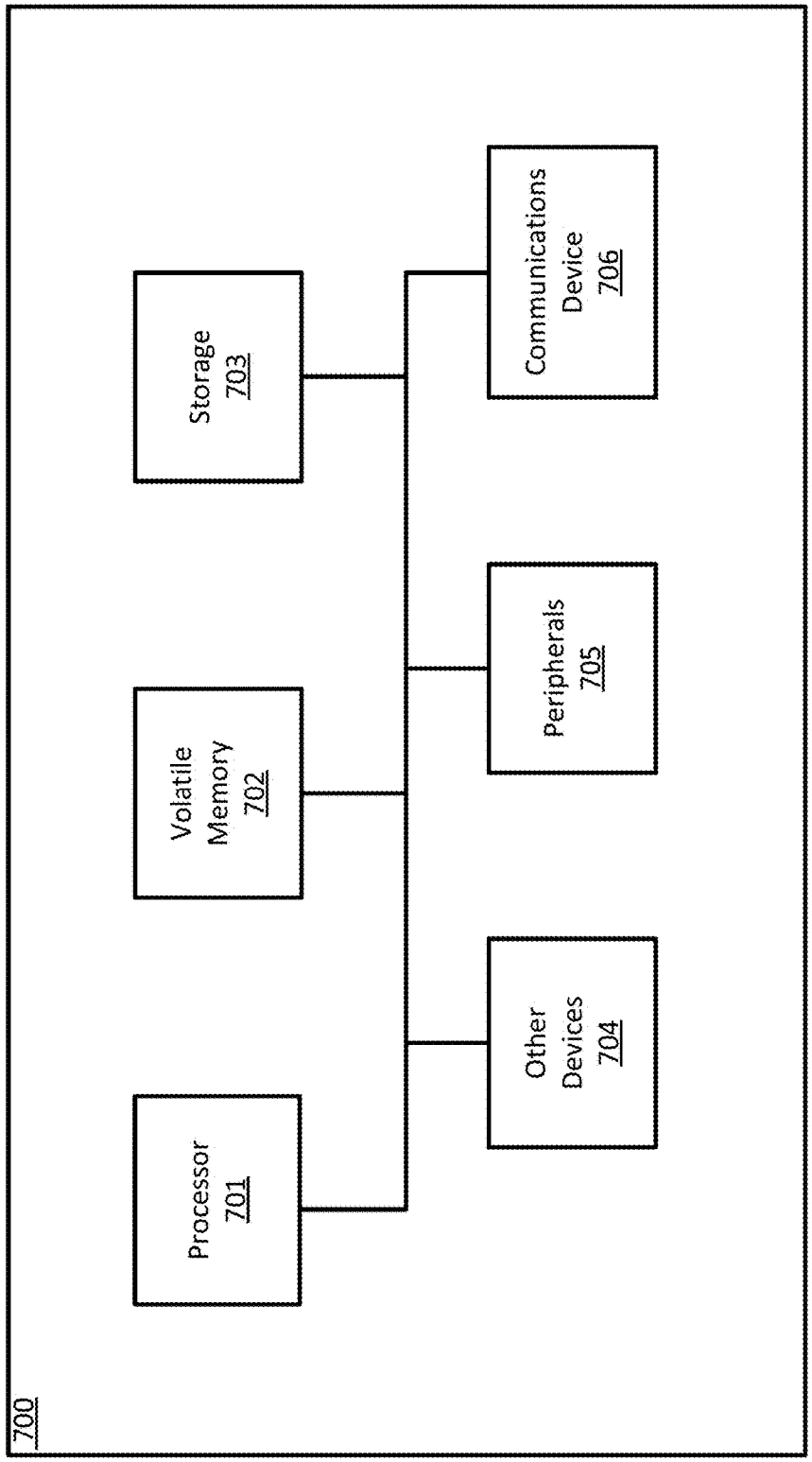
FIG. 7 is a diagram illustrating an exemplary environment in which some embodiments may operate.

FIG. 7 is a diagram illustrating an exemplary computer that may perform processing in some embodiments. As shown in the example of FIG. 7, an exemplary computer 700 may perform operations consistent with some embodiments. The architecture of computer 700 is exemplary. Computers can be implemented in a variety of other ways. A wide variety of computers can be used in accordance with the embodiments herein.

Processor 701 may perform computing functions such as running computer programs. The volatile memory 702 may provide temporary storage of data for the processor 701. RAM is one kind of volatile memory. Volatile memory typically requires power to maintain its stored information. Storage 703 provides computer storage for data, instructions, and/or arbitrary information. Non-volatile memory, which can preserve data even when not powered and including disks and flash memory, is an example of storage. Storage 703 may be organized as a file system, database, or in other ways. Data, instructions, and information may be loaded from storage 703 into volatile memory 702 for processing by the processor 7.

The computer 700 may include peripherals 705. Peripherals 705 may include input peripherals such as a keyboard, mouse, trackball, video camera, microphone, and other input devices. Peripherals 705 may also include output devices such as a display. Peripherals 705 may include removable media devices such as CD-R and DVD-R recorders/players. Communications device 706 may connect the computer 700 to an external medium. For example, communications device 706 may take the form of a network adapter that provides communications to a network. A computer 700 may also include a variety of other devices 704. The various components of the computer 700 may be connected by a connection medium such as a bus, crossbar, or network.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computer device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general-purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

It will be appreciated that the present disclosure may include any one and up to all of the following examples.

Example 1: A computer-implemented method comprising: identifying a background object portrayed in a background template for a video feed; determining a background template display position for concurrent display of the background object with video feed data; and generating a scaled background template by modifying a current aspect ratio of the background template with the background object set at the background display position according to a video feed aspect ratio; and generating a merged video feed by merging the scaled background template with live video feed data, the merged video feed data providing an unobstructed portrayal of the identified background object.

Example 2: The method of Example 1, further comprising: wherein merging the scaled background comprises: receiving a selection of a foreground display position of a foreground template for the video feed; filtering live video feed data according to the foreground template; generating scaled video feed data by modifying a current aspect ratio of the filtered live video data according to the video feed aspect ratio; and generating the merged video feed by merging the scaled background template with the scaled video feed data.

Example 3: The method of any Examples 1-2, further comprising: wherein identifying a background object portrayed in a background template for a video comprises: identifying at least one of: (i) a logo, (ii) a leading line and (iii) a pre-defined type of object from a plurality of pre-defined object types.

Example 4: The method of any Examples 1-3, further comprising: wherein generating the merged video feed by merging the scaled background template with the scaled video feed data comprises: overlaying the scaled video feed data at the foreground display position over the scaled background template; and merging the overlayed scaled video data with the scaled background template.

Example 5: The method of any Examples 1-4, further comprising: continually comparing a distance between at least a portion of the scaled video feed data with a boundary of the foreground template to a threshold; upon determining the distance exceeds the threshold, determining an aspect ratio of current filtered live video feed data; generating updated scaled video feed data by modifying a current aspect ratio of the current filtered live video data according to the video feed aspect ratio; and generating updated merged video feed by merging the scaled background template with the updated scaled video feed data.

Example 6: The method of any Examples 1-5, further comprising: wherein continually comparing a distance between the portion of the scaled video feed data with a boundary of the foreground template to a threshold occurs while transmitting the merged video feed to one or more user accounts accessing an online video conference.

Example 7: The method of any Examples 1-6, further comprising: wherein generating the merged video feed comprises: generating the merged video feed via a client software application for accessing the online video conference, the merged video feed transmitted from the client software application.

Example 8: A non-transitory computer-readable medium having a computer-readable program code embodied therein to be executed by one or more processors, the program code including instructions for: identifying a background object portrayed in a background template for a video feed; determining a background template display position for concurrent display of the background object with video feed data; and generating a scaled background template by modifying a current aspect ratio of the background template with the background object set at the background display position according to a video feed aspect ratio; and generating a merged video feed by merging the scaled background template with live video feed data, the merged video feed data providing an unobstructed portrayal of the identified background object.

Example 9: The non-transitory computer-readable medium of Example 8, further comprising: wherein merging the scaled background comprises: receiving a selection of a foreground display position of a foreground template for the video feed; filtering live video feed data according to the foreground template; generating scaled video feed data by modifying a current aspect ratio of the filtered live video data according to the video feed aspect ratio; and generating the merged video feed by merging the scaled background template with the scaled video feed data.

Example 10: The non-transitory computer-readable medium of any Examples 8-9, further comprising: wherein generating the merged video feed by merging the scaled background template with the scaled video feed data comprises: generating the merge video feed with an identified logo background object portrayed according to the background template display position while concurrently portraying the scaled video feed data according to the foreground display position.

Example 11: The non-transitory computer-readable medium of any Examples 8-10, further comprising: wherein generating the merged video feed by merging the scaled background template with the scaled video feed data comprises: generating the merge video feed with an identified leading line background object portrayed according to the background template display position while concurrently portraying the scaled video feed data according to the foreground display position.

Example 12: The non-transitory computer-readable medium of any Examples 8-11, further comprising: wherein generating the merged video feed by merging the scaled background template with the scaled video feed data comprises: generating the merge video feed with an identified instance of a pre-defined type of structure background object portrayed according to the background template display position while concurrently portraying the scaled video feed data according to the foreground display position.

Example 13: The non-transitory computer-readable medium of any Examples 8-12, further comprising: continually comparing a distance between at least a portion of the scaled video feed data with a boundary of the foreground template to a threshold; upon determining the distance exceeds the threshold, determining an aspect ratio of current filtered live video feed data; generating updated scaled video feed data by modifying a current aspect ratio of the current filtered live video data according to the video feed aspect ratio; and generating updated merged video feed by merging the scaled background template with the updated scaled video feed data.

Example 14: A communication system comprising one or more processors configured to perform the operations of: receiving a selection of a foreground template for the video feed, the selected foreground template indicating a foreground display position of a foreground silhouette; filtering live video feed data according to the foreground silhouette of the foreground template; generating scaled video feed data by modifying a current aspect ratio of the filtered live video data according to a video feed aspect ratio; and generating a merged video feed by merging the scaled video feed data with a background template.

Example 15: The communication system of Example 14, further comprising: wherein generating the merged video feed comprises: overlaying the scaled video feed data over the background template; and merging the overlayed scaled video data with the background template.

Example 16: The communication system of any Examples 14-15, further comprising: identifying a background object portrayed in a simulated scene of the background template for a video feed; determining a background template display position for concurrent display of the background object with video feed data; generating a scaled background template by modifying a current aspect ratio of the background template with the background object set at the background display position according to the video feed aspect ratio; and generating the merged video feed by merging the scaled background template with the scaled video feed data, the merged video feed data providing an unobstructed portrayal of the identified background object.

Example 17: The communication system of any Examples 14-16, further comprising: wherein identifying a background object comprises: identifying at least one of: (i) a logo, (ii) a leading line and (iii) a pre-defined type of object from a plurality of pre-defined object types.

Example 18: The communication system of any Examples 14-17, further comprising: wherein identifying a background object further comprises: feeding the background template into a machine learning model; and receiving object prediction output providing an identification of the background object.

Example 19: The communication system of any Examples 14-18, further comprising: wherein determining a background template display position comprises: receiving a display position prediction output from the machine learning model, the display position prediction output defining a placement of the identified background object within the dimensions of a defined video frame.

Example 20: The communication system of any Examples 14-19, further comprising: wherein feeding the background template into the machine learning model comprises: sending the background template from a client software application to a remote machine learning model of the communication system, the client software application for accessing an online video conference; and wherein the client software application receives the object prediction output and the display position prediction output.

Example 21: A communication system comprising one or more processors configured to perform the operations of: identifying a background object portrayed in a background template for a video feed; determining a background template display position for concurrent display of the background object with video feed data; and generating a scaled background template by modifying a current aspect ratio of the background template with the background object set at the background display position according to a video feed aspect ratio; and generating a merged video feed by merging the scaled background template with live video feed data, the merged video feed data providing an unobstructed portrayal of the identified background object.

Example 22: A computer-implemented method comprising: receiving a selection of a foreground template for the video feed, the selected foreground template indicating a foreground display position of a foreground silhouette; filtering live video feed data according to the foreground silhouette of the foreground template; generating scaled video feed data by modifying a current aspect ratio of the filtered live video data according to a video feed aspect ratio; and generating a merged video feed by merging the scaled video feed data with a background template.

Example 23: A non-transitory computer-readable medium having a computer-readable program code embodied therein to be executed by one or more processors, the program code including instructions for: receiving a selection of a foreground template for the video feed, the selected foreground template indicating a foreground display position of a foreground silhouette; filtering live video feed data according to the foreground silhouette of the foreground template; generating scaled video feed data by modifying a current aspect ratio of the filtered live video data according to a video feed aspect ratio; and generating a merged video feed by merging the scaled video feed data with a background template.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A computer-implemented method, comprising:
   identifying a background object portrayed in a background template for a video feed;
   determining a background template display position for concurrent display of the background object with the video feed;
   receiving a selection of a foreground display position of a foreground template for the video feed;
   filtering the video feed according to the foreground template prior to modifying a current aspect ratio;
   generating a scaled background template by modifying the current aspect ratio of the background template with the background object set at a background display position according to a video feed aspect ratio;
   generating a scaled video feed by modifying a current aspect ratio of a live video feed according to the video feed aspect ratio; and
   generating a merged video feed by merging the scaled background template with the scaled video feed, the merged video feed providing an unobstructed portrayal of the identified background object.

2. The computer-implemented method of claim 1, wherein identifying a background object portrayed in a background template for a video comprises:
   identifying at least one of: (i) a logo, (ii) a leading line and (iii) a pre-defined type of object from a plurality of pre-defined object types.

3. The computer-implemented method of claim 1, wherein generating the merged video feed by merging the scaled background template with the scaled video feed comprises:
   overlaying the scaled video feed at the foreground display position over the scaled background template; and
   merging the overlayed scaled video feed with the scaled background template.

4. The computer-implemented method of claim 3, further comprising:
   continually comparing a distance between at least a portion of the scaled video feed with a boundary of the foreground template to a threshold;
   upon determining the distance exceeds the threshold, determining an aspect ratio of a current filtered live video feed;
   generating an updated scaled video feed by modifying a current aspect ratio of the current filtered live video feed according to the video feed aspect ratio; and
   generating updated merged video feed by merging the scaled background template with the updated scaled video feed.

5. The computer-implemented method of claim 4, further comprising:
   wherein continually comparing a distance between the portion of the scaled video feed with a boundary of the foreground template to a threshold occurs while transmitting the merged video feed to one or more user accounts accessing an online video conference.

6. The computer-implemented method of claim 5, further wherein generating the merged video feed comprises:
   generating the merged video feed via a client software application for accessing the online video conference, the merged video feed transmitted from the client software application.

7. A non-transitory computer-readable medium having a computer-readable program code embodied therein to be executed by one or more processors, the program code including instructions for:
   identifying a background object portrayed in a background template for a video feed;
   determining a background template display position for concurrent display of the background object with the video feed;
   receiving a selection of a foreground display position of a foreground template for the video feed;
   filtering the video feed according to the foreground template prior to modifying a current aspect ratio;
   generating a scaled background template by modifying the current aspect ratio of the background template with the background object set at a background display position according to a video feed aspect ratio;
   generating a scaled video feed by modifying a current aspect ratio of a live video feed according to the video feed aspect ratio; and
   generating a merged video feed by merging the scaled background template with the scaled video feed, the merged video feed providing an unobstructed portrayal of the identified background object.

8. The non-transitory computer-readable medium of claim 7, wherein generating the merged video feed by merging the scaled background template with the scaled video feed comprises:
   generating the merged video feed with an identified logo background object portrayed according to the background template display position while concurrently portraying the scaled video feed according to the foreground display position.

9. The non-transitory computer-readable medium of claim 7, wherein generating the merged video feed by merging the scaled background template with the scaled video feed comprises:
   generating the merged video feed with an identified leading line background object portrayed according to the background template display position while concurrently portraying the scaled video feed according to the foreground display position.

10. The non-transitory computer-readable medium of claim 7, wherein generating the merged video feed by merging the scaled background template with the scaled video feed comprises:
    generating the merged video feed with an identified instance of a pre-defined type of structure background object portrayed according to the background template display position while concurrently portraying the scaled video feed according to the foreground display position.

11. The non-transitory computer-readable medium of claim 7, further comprising:
    continually comparing a distance between at least a portion of the scaled video feed with a boundary of the foreground template to a threshold;

upon determining the distance exceeds the threshold, determining an aspect ratio of a current filtered live video feed;

generating an updated scaled video feed by modifying a current aspect ratio of the current filtered live video feed according to the video feed aspect ratio; and generating updated merged video feed by merging the scaled background template with the updated scaled video feed.

12. A communication system comprising one or more processors configured to perform operations of:

identifying a background object portrayed in a simulated scene of a background template for a video feed;

determining a background template display position for concurrent display of the background object with a live video feed;

receiving a selection of a foreground template for the live video feed, the selected foreground template indicating a foreground display position of a foreground silhouette;

filtering the live video feed according to the foreground silhouette of the foreground template;

generating a scaled background template by modifying a current aspect ratio of the background template with the background object set at a background display position according to a video feed aspect ratio;

generating a scaled video feed by modifying a current aspect ratio of the live video feed according to the video feed aspect ratio; and generating a merged video feed by merging the scaled background template with the scaled video feed, the merged video feed providing an unobstructed portrayal of the identified background object.

13. The communication system as in claim 12, wherein generating the merged video feed comprises:

overlaying the scaled video feed over the background template; and merging the overlayed scaled video feed with the background template.

14. The communication system as in claim 12, wherein identifying a background object comprises:

identifying at least one of: (i) a logo, (ii) a leading line and (iii) a pre-defined type of object from a plurality of pre-defined object types.

15. The communication system as in claim 14, wherein identifying a background object further comprises:

feeding the background template into a machine learning model; and receiving object prediction output providing an identification of the background object.

16. The communication system as in claim 15, wherein determining a background template display position comprises:

receiving a display position prediction output from the machine learning model, the display position prediction output defining a placement of the identified background object within dimensions of a defined video frame.

17. The communication system as in claim 16, wherein feeding the background template into the machine learning model comprises:

sending the background template from a client software application to a remote machine learning model of the communication system, the client software application for accessing an online video conference; and wherein the client software application receives the object prediction output and the display position prediction output.

* * * * *